United States Patent [19]
Bergin

[11] 3,800,339
[45] Apr. 2, 1974

[54] SINK STOPPER
[76] Inventor: Paul F. Bergin, 1335 Prospect Dr., Mishawaka, Ind. 46544
[22] Filed: Jan. 24, 1972
[21] Appl. No.: 220,230

[52] U.S. Cl. .................................. 4/287, 4/286
[51] Int. Cl. ............................................ A47k 1/14
[58] Field of Search ....................... 4/286, 287, 295

[56] References Cited
UNITED STATES PATENTS

| | | | |
|---|---|---|---|
| 2,479,485 | 8/1949 | Frank | 4/287 |
| 2,668,962 | 2/1954 | Spector | 4/287 |
| 652,667 | 6/1900 | Dickinson | 4/287 |
| 772,434 | 10/1904 | Schultz | 4/65 |
| 1,720,149 | 7/1929 | Rom | 4/287 |
| 2,890,463 | 6/1959 | Young | 4/287 |

FOREIGN PATENTS OR APPLICATIONS
1,044,127  6/1953  France ............................ 4/287
1,089,437  9/1954  France ............................ 4/286

Primary Examiner—Harvey C. Hornsby
Assistant Examiner—Donald B. Massenberg
Attorney, Agent, or Firm—Oltsch & Knoblock

[57] ABSTRACT

A stopper mountable in the drain opening of a basin, sink or similar receptacle. The stopper includes an annular member having a fluid opening therethrough. A threaded stem is positioned within the opening of the annular member and is held in a spaced relationship from the sides of the annular member. A plug which constitutes a part of the stopper is threaded over the top of the stem and is shiftable between a closed position in which the plug engages the annular member to plug the fluid opening therethrough and an open position in which the plug is spaced from the annular member so as to permit fluid flow through the member.

9 Claims, 5 Drawing Figures

SINK STOPPER

SUMMARY OF THE INVENTION

This invention relates to a stopper which is mountable in the drain opening of a basin, sink or similar fluid receptacle.

The stopper of this invention includes an annular member having spaced upper and lower edges and a longitudinal axis along which a vertically extending fluid opening through the member passes. An externally threaded stem is positioned within the fluid opening in the annular member. Means locates the stem in a spaced relationship from the annular member. A plug having a central cavity therein which is open at the lower end and which is internally threaded is turned onto the upper end of the stem with the respective threads of the stem and plug interlockingly engaging. The plug, as it is turned upon the stem, shifts into and out of contact with the annular member to close and open the fluid opening therethrough. In some constructions of this invention, the plug may carry a crumb cup which serves to trap the larger solid waste particles carried by the fluid when passing through the annular member.

It is an object of this invention to provide a stopper for a basin, sink or similar receptacle having an annular member which is connectable to the receptacle and which carries an upwardly projecting stem having a plug threaded thereon which can be made upon rotation on the stem to seal the fluid opening through the annular member.

Another object of this invention is to provide a stopper which is mountable in the drain opening of a basin, sink or similar receptacle and which is of economic manufacture and simple operation.

Other objects of this invention will become apparent upon a reading of the invention's description.

DESCRIPTION OF THE PREFERRED EMBODIMENTS

The preferred embodiments illustrated are not intended to be exhaustive or to limit the invention to the precise forms disclosed. They are chosen and described in order to best explain the invention and its application and practical use to thereby enable others skilled in the art to best utilize the invention.

Figure 1:
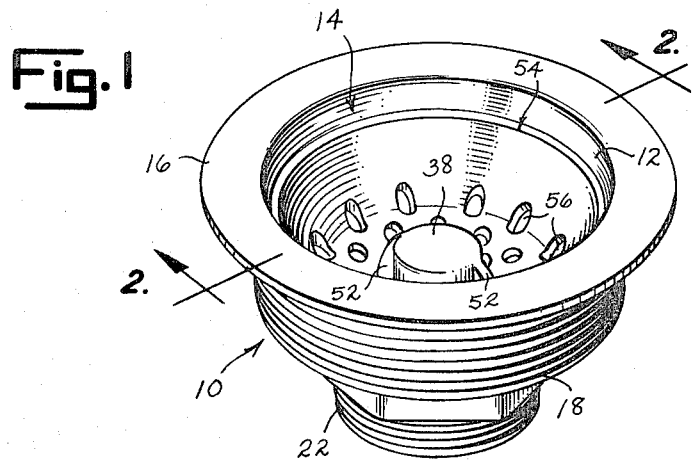
FIG. 1 is a perspective view of one embodiment of the stopper of this invention.
Figure 2:
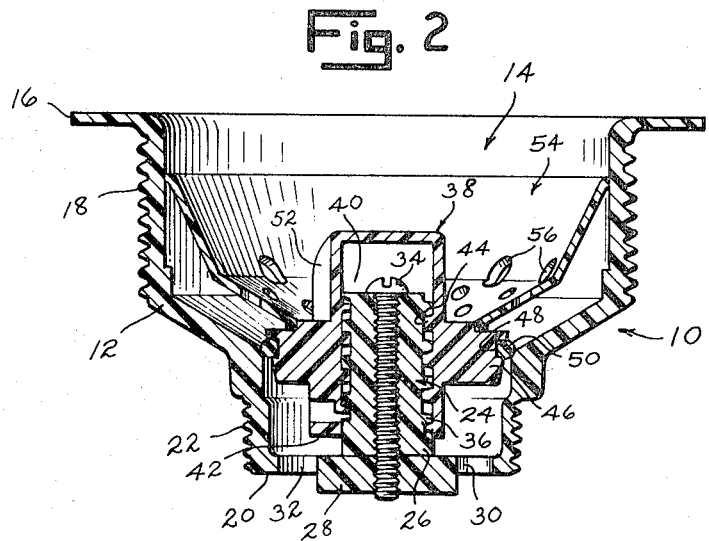
FIG. 2 is a sectional view taken along line 2—2 of FIG. 1 showing the stopper in a closed position.
Figure 3:
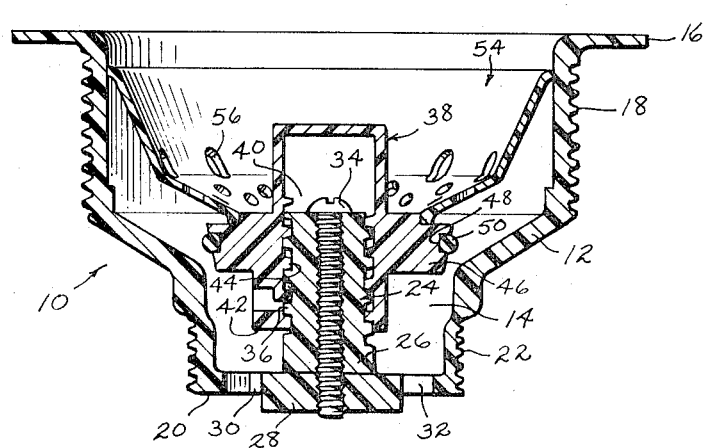
FIG. 3 is a sectional view of the stopper taken along line 2—2 of FIG. 1 showing the stopper in an open position.

Referring to the embodiment of the stopper shown in FIGS. 1–3, the reference numeral 10 refers to an annular member having a stepped side wall 12 which defines a fluid opening 14 through the annular member. The upper edge of annular member 10 is formed into an outturned annular flange 16 with the upper portion of side wall 12 adjacently below the flange having external threads 18 formed therein. Annular member 10 is adapted to be inserted into the drain opening of a basin, sink or similar receptacle with flange 16 resting upon the marginal edge of the drain opening and with a suitable lock nut being turned onto threads 18 under the receptacle base to draw the flange against the base and thus secure the annular member to the receptacle. A suitable gasket or similar sealing material can be disposed between flange 16 and the base of the receptacle to prevent any leakage of fluid around the annular member. That portion of side wall 12 adjacently above lower edge 20 of the annular member has threads 22 formed therein to accommodate a fitting which serves to secure a drain pipe to the annular member.

A stem 24 is located within the fluid opening 14 in annular member 10 and spaced from side wall 12. Stem 24 is positioned along the longitudinal axis of the annular member and is connected at its lower end 26 to the lower end 20 of the annular member by means of a support 28 which includes radially extending, angularly spaced arms 30 which extend between the side wall and the stem. Support 28 defines a spider having spaces or openings 32 between its arms 30 to permit the flow of fluid through opening 14 in the annular member. Stem 24 may be secured to support 28 by a screw 34, as shown in FIGS. 2 and 3, bonded by suitable adhesive to the support 28, or formed integrally with the support. The outer surface of stem 24 is interrupted by an external thread 36.

A rotatable plug 38 is carried upon stem 24. Plug 38 has a cavity 40 formed therein which is open at the bottom end 42 of the plug. The side wall of cavity 40 is interrupted by threads 44 which are designed to engage threads 36 carried by stem 24. Plug 38 includes an annular flange 46 which is formed concentrically about cavity 40 and which has an annular groove 48 formed therein. An O-ring 50 is carried within groove 48 of flange 46.

Plug 38 is fitted over the upper end of stem 24 with the stem entering cavity 40 and the respective threads 36 and 44 of the stem and plug rotatably interlocking. Plug 38 when turned upon stem 24 is shiftable between a closed position, as illustrated in FIG. 2, wherein O-ring 50 makes circumferential sealing contact with side wall 12 of annular member 10 to prevent the passage of fluid through opening 14 in the annular member and an open position, as illustrated in FIG. 3, wherein the plug is shifted upwardly relative to annular member 10 to space O-ring 50 from side wall 12 of the annular member to permit the passage of fluid through opening 14 therein. Threads 36 and 44 are designed so as to have a maximum lead to enable plug 38 when turned to be quickly shifted between its open and closed positions with maximum ease. The upper end of plug 38 is designed with one or more tabs 52 by which the user of the stopper can readily grip the plug to facilitate its rotation.

If desired, plug 38 can carry a crumb cup 54 which fits within opening 14 in annular member 10 and which serves to catch and retain the larger particulate matter in the fluid as the fluid passes through opening 14 and the strainer openings 56 in the cup. Crumb cup 54 is preferably rigidly connected to plug 38 and, as a consequence, turns with the plug as the plug is shifted between its open and closed positions.

Figure 4:
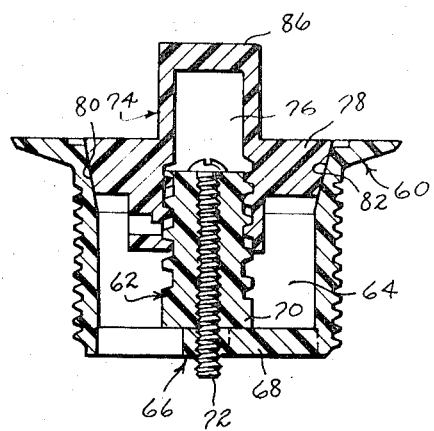
FIG. 4 is a longitudinal sectional view of a modified embodiment of the stopper of this invention.
Figure 5:
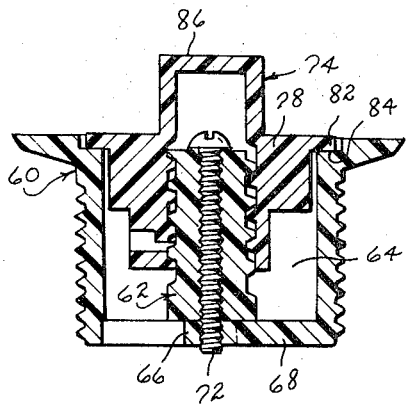
FIG. 5 is a longitudinal sectional view of another modified embodiment of the stopper of this invention.

In FIGS. 4 and 5 the stopper of this invention is shown in modified forms. Annular member 60 of the stopper shown in FIG. 4 is adapted to be inserted into the drain opening of a sink, basin or similar receptacle in much the same fashion as that described for annular member 10 in the above mentioned embodiment. An externally threaded stem 62 is coaxially positioned within opening 64 in annular member 60 and is supported therein in a spaced relationship from the side walls of the annular member by a spider-like support 66. Support 66 includes radially extending, angularly spaced arms 68 which connect with the lower end 70 of member 60. A screw 72 connects stem 62 to support 66. Plug 74 is fitted over the upper end of stem 62 with the stem extending into the internally threaded cavity 76 of the plug. Plug 74 includes a concentric flange 78 whose outer circumferential edge 80 is tapered to make sealing engagement in a wedge fit with a complementally tapered side wall part 82 of annular member 60 when the plug is turned into its closed position as shown in FIG. 4. Plug 74 may be turned upon stem 62 and raised relative to annular member 60 thereby causing its edge 80 to be separated from annular member wall part 82 to permit the passage of fluid through opening 64 in the annular member.

The stopper shown in FIG. 5 is of a similar construction as the stopper shown in FIG. 4, with the exception that flange 78 of plug 74 carries an annular lip 82 which, when the plug is turned upon stem 62 and shifted into its closed position as shown, makes circumferential sealing engagement with a shoulder 84 formed at the upper edge of annular member 60. When plug 74 is turned into its open position, lip 82 will be spaced from shoulder 84 to permit fluid to pass through opening 64 in the annular member. Plug 74 in both of the embodiments shown in FIGS. 4 and 5 includes an upwardly projecting grip part 86 which enables the plug to be readily rotated relative to stem 62 and annular member 60.

In each of the above described embodiments of the stopper of this invention, stems 24 and 62 may be formed integrally with supports 28 and 66. Annular members 10 and 60 and plugs 38 and 74, including crumb cup 54, may be formed of a molded plastic.

It is to be understood that the invention herein described is not to be limited to the details herein given but may be modified within the scope of the appended claims.

What I claim is:

1. A stopper mountable in the drain opening of a basin, sink or similar receptacle comprising an annular member having spaced upper and lower edges and a fluid opening extending downwardly through the annular member and along its longitudinal axis, a stem having an external thread formed thereon positioned within said annular member opening and extending along said longitudinal axis, said stem being spaced from said annular member and having upper and lower ends, means having openings therein connecting said stem at its lower end to said annular member whereby fluid may pass around said stem and through said annular member, the external thread on said stem extending upwardly from said stem connecting means, a plug having a cavity therein open at its lower end, said cavity being internally threaded for engagement with the threads of said stem, said annular member including a valve seat surface coaxial with said stem and encircling said annular member opening, said plug carrying an annular valve part and being loosely turned onto the upper end of said stem with said stem fitting within said plug cavity and the respective threads of the stem and plug interlockingly engaging, said plug being turnable upon said stem between a closed position wherein said plug valve part makes circumferential sealing contact with said annular member valve seat and an open position wherein said plug is spaced from said annular member.

2. The stopper of claim 1 wherein said plug includes grip means for turning said plug between its open and closed positions.

3. The stopper of claim 1 wherein said valve part is an O-ring held within an annular groove formed in said plug.

4. The stopper of claim 1 wherein said valve part is a tapered surface making a wedge fit with said annular valve seat when said plug is turned into its closed position.

5. The stopper of claim 1 wherein said valve part is an outturned annular lip.

6. The stopper of claim 1 and a crumb cup having a plurality of openings therein and fitted into said annular member opening, said plug carrying said crumb cup.

7. The stopper of claim 6 wherein said crumb cup is connected to said plug for movement with the plug.

8. The stopper of claim 7 wherein said plug includes a grip means for turning said plug, said grip means being oppositely located from said opening into said cavity therein and projecting upwardly into said cup.

9. A stopper mountable in the drain opening of a basin, sink or similar receptacle comprising an annular member having spaced upper and lower edges and a fluid opening extending downwardly through the annular member and along its longitudinal axis, a stem having an external thread formed thereon positioned within said annular member opening and extending along said longitudinal axis, said stem being spaced from said annular member and having upper and lower ends, means having openings therein connecting said stem at its lower end to said annular member whereby fluid may pass around said stem and through said annular member, the external thread on said stem extending upwardly from said stem connecting means, a plug having a cavity therein open at its lower end, said cavity being internally threaded for engagement with the threads of said stem, said annular member including a valve seat surface coaxial with said stem and encircling said annular member opening, said plug carrying an annular valve part and being loosely turned onto the upper end of said stem with said stem fitting within said plug cavity and the respective threads of the stem and plug interlockingly engaging, said plug constituting grip means by which said plug is turnable upon said stem between a closed position wherein said plug valve part makes circumferential sealing contact with said annular member valve seat and said stem upper end extends upwardly into said plug above said valve part and an open position wherein said plug is spaced from said annular member.

* * * * *